(12) United States Patent
Hatano et al.

(10) Patent No.: US 11,077,638 B2
(45) Date of Patent: Aug. 3, 2021

(54) EDGE STRUCTURE OF FIBER REINFORCED RESIN STRUCTURE BODY

(71) Applicant: Suzuki Motor Corporation, Hamamatsu (JP)

(72) Inventors: Daisuke Hatano, Hamamatsu (JP); Kenta Suzuki, Hamamatsu (JP)

(73) Assignee: SUZUKI MOTOR CORPORATION

( * ) Notice: Subject to any disclaimer, the term of this patent is extended or adjusted under 35 U.S.C. 154(b) by 0 days.

(21) Appl. No.: 16/780,098

(22) Filed: Feb. 3, 2020

(65) Prior Publication Data

US 2020/0247082 A1   Aug. 6, 2020

(30) Foreign Application Priority Data

Feb. 4, 2019   (JP) .............................. JP2019-017961

(51) Int. Cl.
| | |
|---|---|
| *B32B 5/06* | (2006.01) |
| *B32B 3/02* | (2006.01) |
| *B32B 5/12* | (2006.01) |

(52) U.S. Cl.
CPC .................. *B32B 3/02* (2013.01); *B32B 5/06* (2013.01); *B32B 5/12* (2013.01); *Y10T 428/24124* (2015.01); *Y10T 428/24322* (2015.01)

(58) Field of Classification Search
CPC ..... Y10T 428/24124; Y10T 428/24322; Y10T 16/05; B32B 3/04; B32B 5/06–12; B29K 2105/12; B29K 2105/14
See application file for complete search history.

(56) References Cited

U.S. PATENT DOCUMENTS 4,865,792 A * 9/1989 Moyer ................ B29C 63/0082
264/249
8,646,489 B2    2/2014 Kanao
(Continued)

FOREIGN PATENT DOCUMENTS

| DE | 102010013131 A1 | 6/2011 |
|---|---|---|
| DE | 102011005219 A1 | 9/2012 |

(Continued)

OTHER PUBLICATIONS

First Examination Report for Indian Patent Application No. 202044001017, dated May 11, 2021, 5 pages.
(Continued)

*Primary Examiner* — Alexander S Thomas
(74) *Attorney, Agent, or Firm* — Lerner, David, Littenberg, Krumholz & Mentlik, LLP (57) ABSTRACT

In an edge structure of a fiber reinforced resin structure body, an edge part of the structure body is enabled to be efficiently reinforced, and the edge part of the structure body is enabled to be efficiently protected. The present invention relates to an edge structure of a fiber reinforced resin structure body having a first fiber reinforced resin portion (hereinafter referred to as "first portion") and a second fiber reinforced resin portion (hereinafter referred to as "second portion") composed using a fiber reinforced resin, the first portion having a layer part formed in layers. In the edge structure of a fiber reinforced resin structure body, the second portion has an edge-side cover part extending along an edge section of the layer part of the first portion, and a plurality of fibers in the edge-side cover part are arranged along the edge section of the layer part.

4 Claims, 4 Drawing Sheets

(56) References Cited

U.S. PATENT DOCUMENTS 8,663,791 B2 3/2014 Day et al.
2012/0269999 A1 10/2012 Kind et al.

FOREIGN PATENT DOCUMENTS

| DE | 102012000772 A1 | 7/2013 |
|----|-----------------|--------|
| EP | 2497624 A2 | 9/2012 |
| JP | 2015051663 A | 3/2015 |
| JP | 6122741 B2 | 4/2017 |

OTHER PUBLICATIONS

First Office Action for German Application No. 102020101714.6 dated May 26, 2021; 7 pages.

\* cited by examiner

EDGE STRUCTURE OF FIBER REINFORCED RESIN STRUCTURE BODY

CROSS-REFERENCE TO RELATED APPLICATIONS

The present application claims the benefit of Japanese Patent Application Serial No. 2019-017961, filed on Feb. 4, 2019, the disclosure of which is hereby incorporated herein by reference.

BACKGROUND OF THE INVENTION

Technical Field

The present invention relates to an edge structure of a fiber reinforced resin structure body formed using a fiber reinforced resin.

Background Art

In a mechanical structure, in particular, a vehicle, such as a motorcycle, an automobile etc., a fiber reinforced resin structure body composed using a fiber reinforced resin is occasionally used. Since a fiber reinforced resin has characteristics of lightness in weight and high strength, the fiber reinforced resin structure body using this fiber reinforced resin is employed for a portion which must have reduction in weight and improvement in strength.

As an example of the fiber reinforced resin structure body, the fiber reinforced resin structure body in which a fiber reinforced resin frame composed of a fiber reinforced resin is fastened to another frame with bolts, in a saddled vehicle, such as a motorcycle etc., is cited. Specifically, in such an example of the fiber reinforced resin structure body, a fiber reinforced resin frame has a stacked body composed of first and second members which are stacked on each other and bonded to each other with a urethane-based adhesive agent, the first member is arranged between another frame and the second member, and has a first through hole penetrating in the thickness direction, the second member has a second through hole which penetrates in the thickness direction, and is smaller in diameter than the first through hole, a collar member is inserted into the first through hole, the outer circumferential surface of the collar member is bonded to the inner circumferential surface of the first through hole with a urethane-based adhesive agent, a flange member being arranged between the fiber reinforced resin structure body and a head of a bolt, and a screw part of the bolt is fastened to the other frame through the second through hole and a hollow part of the collar member (for example, refer to Japanese Patent Publication JP 2015-051663 A).

BRIEF SUMMARY OF THE INVENTION

Technical Problem

However, in the fiber reinforced resin structure body having the stacked body and the fastening holes, such as the first and second through holes, penetrating the stacked body as in the example of the fiber reinforced resin structure body above, when stress concentrates at peripheral parts of the fastening holes, breakage, such as delamination etc. may arise on the stacked body. The stacked body occasionally has an edge part other than the peripheral parts of the fastening holes. When load is locally exerted from the outside, for example, to the edge part other than the peripheral parts of the fastening holes, breakage, such as delamination etc. may arise on the stacked body. Furthermore, when reinforcement materials, such as a flange member, an adhesive agent, etc. are used for reinforcing the edge part of the stacked body as in the example of the fiber reinforced resin structure body above, the number of components may increase, and the number of production steps may increase.

In view of the aforementioned circumstances, in an edge structure of a fiber reinforced resin structure body, it is desired to be capable of efficiently reinforcing an edge part of the fiber reinforced resin structure body, and it is desired to be capable of efficiently protecting the edge part of the fiber reinforced resin structure body. Incidentally, in an edge structure of a fiber reinforced resin structure body, it is desired to be capable of suppressing an increase in the number of components, and it is desired to be capable of suppressing an increase in the number of production steps.

Solution to the Problem

To solve the problems as above, there is provided an edge structure of a fiber reinforced resin structure body according to an aspect, including first and second fiber reinforced resin portions composed using a fiber reinforced resin, the first fiber reinforced resin portion having a layer part formed in layers, wherein the second fiber reinforced resin portion has an edge-side cover part extending along an edge section of the layer part of the first fiber reinforced resin portion, and fibers in the edge-side cover part are arranged along the edge section of the layer part.

Advantageous Effect of the Invention

According to the edge structure of a fiber reinforced resin structure body according to an aspect, the edge part of the fiber reinforced resin structure body can be efficiently reinforced, and the edge part of the fiber reinforced resin structure body can be efficiently protected. Incidentally, in the edge structure of a fiber reinforced resin structure body, an increase in the number of components can be suppressed, and an increase in the number of production steps can be suppressed.

DETAILED DESCRIPTION

Edge structures of fiber reinforced resin structure bodies according to First and Second Embodiments will be described. Notably, in the present Embodiments, there are exemplarily described cases in which an edge structure of a fiber reinforced resin structure body (hereinafter referred to simply as "structure body", if necessary) is applied to a seat rail of a motorcycle. However, the present invention is not limited to these, but the edge structure of the structure body can also be applied to a component other than a seat rail of a motorcycle. For example, the edge structure of the structure body can be applied to a component of motorcycle other than the seat rail, a component of automobile, and the like.

For a fiber reinforced resin used for each of the edge structures of the structure bodies according to the present Embodiments, at least one of a continuous fiber reinforced resin and a discontinuous fiber reinforced resin is used. Furthermore, the fiber reinforced resin contains a predetermined resin material and a plurality of fibers.

As the resin material of the fiber reinforced resin, a thermo-plastic resin or a thermosetting resin can be used. As the thermo-plastic resin, for example, polyamide, polypropylene, or the like can be used. As the thermosetting resin, for example, an epoxy resin, a phenol resin, or the like can be used.

The fibers of the fiber reinforced resin can be carbon fibers, glass fibers, polyamide fibers, polyethylene fibers, or the like. When the fiber reinforced resin is a discontinuous fiber reinforced resin, in view of a reinforcement effect, the length of one fiber may be 10 mm or more.

First Embodiment

The edge structure of a fiber reinforced resin structure body according to the First Embodiment is described along with a seat rail of a motorcycle to which it is applied. The edge structure of a fiber reinforced resin structure body according to the present Embodiment is applied to an outer circumferential edge part of the structure body.

Outline of Edge Structure of Fiber Reinforced Resin Structure Body

An outline of the edge structure of a fiber reinforced resin structure body according to the present Embodiment is described with reference to FIG. 1. The structure body has a first fiber reinforced resin portion (hereinafter referred to simply as "first portion", if necessary) 10 composed using a fiber reinforced resin. The first portion 10 contains a plurality of fibers 10a of the fiber reinforced resin used for this. The structure body has a second fiber reinforced resin portion (hereinafter referred to simply as "second portion", if necessary) 20 composed using a fiber reinforced resin prepared separately from the fiber reinforced resin of the first portion 10. The second portion 20 also contains a plurality of fibers 20a of the fiber reinforced resin used for this.

The fiber reinforced resin of the first portion 10 is a continuous fiber reinforced resin, and the fiber reinforced resin of the second portion 20 is a discontinuous fiber reinforced resin. Therefore, the plurality of fibers 10a of the first portion 10 are continuous fibers, and the plurality of fibers 20a of the second portion 20 are discontinuous fibers. However, the present invention is not limited to this, but the fiber reinforced resins of the first and second portions can be continuous fiber reinforced resins, or the fiber reinforced resins of the first and second portions can be discontinuous fiber reinforced resins, or the fiber reinforced resin of the first portion can be a discontinuous fiber reinforced resin and the fiber reinforced resin of the second portion can be a continuous fiber reinforced resin.

Furthermore, in view of enhancement of joining performance, in particular, bonding performance between the first and second portions 10, 20, resin materials of the fiber reinforced resins used for the first and second portions 10, 20 may be the same as each other. However, the present invention is not limited to this, and these resin materials can also differ from each other.

For example, when the fibers of the fiber reinforced resin of the first portion 10 are carbon fibers, in view of prevention of electrolytic corrosion, the fibers of the fiber reinforced resin of the second portion 20 may be glass fibers. However, in the present invention, the fibers of the fiber reinforced resins of the first and second portions are not limited to these.

In such a structure body, the first portion 10 has a layer part 11 formed in layers. The second portion 20 has an edge-side cover part 21 extending along an edge section 11a of the layer part 11 of the first portion 10. In the edge-side cover part 21, the fibers 20a are arranged along the edge section 11a of the layer part 11 of the first portion 10.

A state in which the fibers 20a in the edge-side cover part 21 in the second portion 20 are arranged along the edge section 11a of the layer part 11 of the first portion 10, may be defined by orientation angles of the fibers 20a as follows. When an orientation angle of each fiber 20a in the edge-side cover part 21 in the second portion 20 is defined as an angle of the longitudinal direction of the fiber 20a relative to a shortest straight line connecting both ends, in the thickness direction of the edge section 11a, of the edge section 11a in the first portion 10, an average value of the orientation angles may be within a range from about 0 degrees to about 30 degrees, in particular, within a range from about 0 degrees to about 10 degrees.

Figure 1:
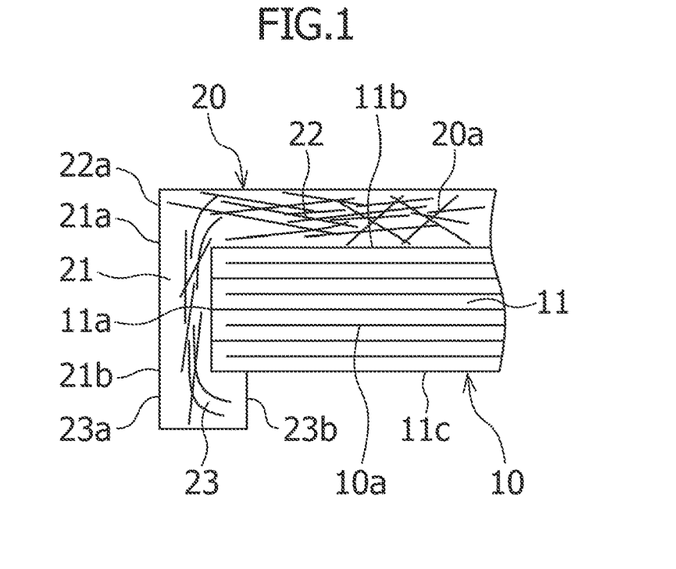
FIG. 1 is a longitudinal cross-sectional view schematically showing an outer circumferential edge part of a fiber reinforced resin structure body according to a First Embodiment and its periphery.

Notably, in FIG. 1, the shortest straight line connecting both ends, in the thickness direction of the edge section 11a, of the edge section 11a in the first portion 10 is substantially parallel to the thickness direction. However, the shortest straight line may be inclined relative to the thickness direction. Furthermore, when each fiber 20a in the edge-side cover part 21 is curved, a direction along a straight line connecting both ends of the fiber 20a is defined as the longitudinal direction of the fiber 20a. This definition of the longitudinal direction of a fiber can also be applied to fibers arranged outside the edge-side cover part. Furthermore, this definition of the longitudinal direction of a fiber can also be applied to both of continuous fibers and discontinuous fibers.

Here, a method of calculating the average value of orientation angles for the plurality of fibers 20a in the edge-side cover part 21 is exemplarily described. One hundred fibers 20a are selected at random from the region of the edge-side cover part 21, and the orientation angles of these 100 fibers are measured. The average value of the orientation angles of the 100 fibers thus measured is then calculated. Notably, as a method of measuring orientation angles of fibers, for example, an image of the fibers 20a in the edge-side cover part 21 can be captured using X-ray CT, and the orientation angle of each fiber 20a can be measured from the captured image. Furthermore, when it is difficult to capture such an image using X-ray CT due to high transmittance of X-rays through the fibers 20a, an image may be captured using an electron microscope. However, the method of measuring orientation angles of fibers is not limited to these. Furthermore, the method of calculating the average value of orientation angles for a plurality of fibers, and the method of measuring orientation angles of fibers can be applied also outside the edge-side cover part of the second portion.

Furthermore, the edge structure of the structure body may be configured as follows. Namely, the second portion 20 has one layer part 22 arranged along one surface 11b, in the thickness direction of the layer part 11, of the layer part 11 in the first portion 10. The one layer part 22 is formed integrally with the edge-side cover part 21. However, the present invention is not limited to this, and the second portion need not have the one layer part.

Furthermore, the second portion 20 has the other layer part 23 arranged along the other surface 11c, in the thickness direction of the layer part 11, of the layer part 11 in the first portion 10. The other layer part 23 is formed integrally with the edge-side cover part 21. However, the present invention is not limited to this, and the second portion need not have the other layer part.

Details of Edge Structure of Fiber Reinforced Resin Structure Body

Details of the edge structure of a fiber reinforced resin structure body according to the present Embodiment are described with reference to FIG. 1. Namely, the edge structure of the structure body can be configured as follows in more detail. The resin materials of the fiber reinforced resins of the first and second portions 10, 20 may be the same as each other in their types, or may differ from each other in their types. The fibers of the fiber reinforced resins of the first and second portions 10, 20 may be the same as each other in their types, or may differ from each other in their types.

In FIG. 1, the first portion 10 is a stacked structure composed of four layers having continuous fibers oriented along one reinforcement direction in sectional view. However, in the present invention, the reinforcement direction of continuous fibers is not limited to this when the fibers of the fiber reinforced resin of the first portion are continuous fibers. Furthermore, the stacked structure may be composed of two, three or five or more layers.

The one surface 11b and the other surface 11c of the layer part 11 of the first portion 10 may be substantially parallel to each other. In this case, the thickness direction of the layer part 11 may be a direction substantially perpendicular to the one surface 11b and the other surface 11c. However, the present invention is not limited to this, but these one surface and the other surface can also be not in parallel to each other. In this case, the thickness direction of the layer part may be a direction substantially perpendicular to a virtual center plane positioned at a substantial center between the one surface and the other surface.

The edge section 11a of the layer part 11 of the first portion 10 may extend in a straight shape along the thickness direction of the layer part 11. However, the present invention is not limited to this, but the edge section may be inclined relative to the thickness direction of the layer part, and/or the edge section may be curved.

In the layer part 11 of the first portion 10, the plurality of fibers 10a are arranged along the in-plane direction of the layer part 11. Furthermore, the plurality of fibers 10a may be arranged such that the longitudinal direction thereof is along one direction in the in-plane direction of the layer part 11. In particular, the one direction within the in-plane direction of the layer part 11 may be a direction crossing the edge section 11a of the layer part 11 within the in-plane direction of the layer part 11.

In the layer part 11 of the first portion 10, the longitudinal direction of each fiber 10a may be oriented at an angle from about 0 degrees to about 45 degrees relative to the one direction within the in-plane direction of the layer part 11, preferably at an angle from about 0 degrees to about 30 degrees, still preferably at an angle from about 0 degrees to about 10 degrees. When the fiber reinforced resin of the first portion 10 is a continuous fiber reinforced resin, the plurality of fibers 10a may be substantially parallel to one another, and furthermore, the longitudinal directions of the plurality of fibers 10a may substantially correspond to the one direction in the in-plane direction of the layer part 11. However, the present invention is not limited to this, and, for example, the plurality of fibers may be composed of: fibers which are substantially parallel to one another and are oriented such that their longitudinal directions substantially correspond to one direction within the in-plane direction of the layer part; and other fibers which are substantially parallel to one another and are oriented such that their longitudinal directions substantially correspond to a direction crossing the fibers within the in-plane direction of the layer part, in particular, to a direction substantially perpendicular to those therein.

When an orientation angle of each fiber 10a in the layer part 11 in the first portion 10 is defined as an angle of the longitudinal direction of the fiber 10a relative to one direction within the in-plane direction of the layer part 11, an average value of the orientation angles may be within a range from about 0 degrees to about 30 degrees, in particular, within a range from about 0 degrees to about 10 degrees.

Furthermore, although not particularly clearly shown in the figures, the edge-side cover part 21, the one layer part 22, and the other layer part 23 of the second portion 20 can also be stacked structures having two or more layers. The edge-side cover part 21 of the second portion 20 has one end section 21a and the other end section 21b which are respectively positioned on one side and the other side of the layer part 11 of the first portion 10 in the thickness direction.

In the edge-side cover part 21 of the second portion 20, the longitudinal direction of each fiber 20a may be oriented at an angle from about 0 degrees to about 45 degrees relative to the shortest straight line connecting both ends, in the thickness direction of the edge section 11a, of the edge section 11a in the first portion 10, preferably at an angle from about 0 degrees to about 30 degrees, still preferably at an angle from about 0 degrees to about 10 degrees. When the fiber reinforced resin of the second portion 20 is a continuous fiber reinforced resin, the plurality of fibers 10a may be substantially parallel to one another, and furthermore, the longitudinal directions of the plurality of fibers 20a may substantially correspond to the thickness direction of the layer part 11 of the first portion 10. However, the present invention is not limited to this, and, for example, the plurality of fibers may be composed of: fibers which are substantially parallel to one another and are oriented such that their longitudinal directions substantially correspond to one direction within the in-plane direction of the edge-side cover part; and other fibers which are substantially parallel to one another and are oriented such that their longitudinal directions substantially correspond to a direction crossing the fibers in the in-plane direction of the edge-side cover part, in particular, to a direction substantially perpendicular to those therein.

The one layer part 22 of the second portion 20 has an outer edge section 22a which is positioned so as to correspond to the one end section 21a of the edge-side cover part 21 in its in-plane direction. The outer edge section 22a of the one layer part 22 is continuously connected to the one end section 21a of the edge-side cover part 21.

In the one layer part 22 of the second portion 20, the plurality of fibers 20a are arranged along the in-plane direction of the one layer part 22. Furthermore, the plurality of fibers 20a may be arranged along one direction within the in-plane direction of the one layer part 22. In particular, the one direction within the in-plane direction of the one layer part 22 may be a direction crossing the outer edge section 22a of the one layer part 22 in the in-plane direction of the one layer part 22.

In the one layer part 22 of the second portion 20, the longitudinal direction of each fiber 20a may be oriented at an angle from about 0 degrees to about 45 degrees relative to the one direction within the in-plane direction of the one layer part 22, preferably at an angle from about 0 degrees to about 30 degrees, still more preferably at an angle from about 0 degrees to about 10 degrees. The fibers 20a may be arranged along a direction substantially parallel to the fibers 10a in the layer part 11 of the first portion 10. When the fiber reinforced resin of the second portion 20 is a continuous fiber reinforced resin, the plurality of fibers 20a may be substantially parallel to one another, and furthermore, the longitudinal directions of the plurality of fibers 20a may substantially correspond to the one direction within the in-plane direction of the one layer part 22. However, the present invention is not limited to this, and, for example, the plurality of fibers may be composed of: fibers which are substantially parallel to one another and are oriented such that their longitudinal directions substantially correspond to one direction within the in-plane direction of the one layer part; and other fibers which are substantially parallel to one another and are oriented such that their longitudinal directions substantially correspond to a direction crossing the fibers in the in-plane direction of the one layer part, in particular, to a direction substantially perpendicular to those therein.

When an orientation angle of each fiber 20a in the one layer part 22 in the second portion 20 is defined as an angle of the longitudinal direction of the fiber 20a relative to one direction within the in-plane direction of the one layer part 22, an average value of the orientation angles may be within a range from about 0 degrees to about 30 degrees, in particular, within a range from about 0 degrees to about 10 degrees.

The other layer part 23 of the second portion 20 has an outer edge section 23a which is positioned so as to correspond to the other end section 21b of the edge-side cover part 21 in its in-plane direction. The outer edge section 23a of the other layer part 23 is continuously connected to the other end section 21b of the edge-side cover part 21. The other layer part 23 of the second portion 20 has an inner edge section 23b which is positioned so as to face its outer edge section 23a in its in-plane direction. For example, when the structure body is particularly a press-molded article, as mentioned later, a distance from the edge section 11a of the layer part 11 in the first portion 10 to the inner edge section 23b of the other layer part 23 in the second portion 20 may be about twice or less the thickness of the layer part 11 in the first portion 10.

In the other layer part 23 of the second portion 20, the plurality of fibers 20a are arranged along the in-plane direction of the other layer part 23. Furthermore, the plurality of fibers 20a may be arranged along one direction within the in-plane direction of the other layer part 23. In particular, the one direction within the in-plane direction of the other layer part 23 may be a direction crossing the outer edge section 23a of the other layer part 23 in the in-plane direction of the other layer part 23.

In the other layer part 23 of the second portion 20, the longitudinal direction of each fiber 20a may be oriented at an angle from about 0 degrees to about 45 degrees relative to the one direction within the in-plane direction of the other layer part 23, preferably at an angle from about 0 degrees to about 30 degrees, still preferably at an angle from about 0 degrees to about 10 degrees. The fibers 20a may be arranged along a direction substantially parallel to the plurality of fibers 10a in the layer part 11 of the first portion 10. When the fiber reinforced resin of the second portion 20 is a continuous fiber reinforced resin, the plurality of fibers 20a may be substantially parallel to one another, and furthermore, the longitudinal directions of the plurality of fibers 20a may substantially correspond to the one direction within the in-plane direction of the other layer part 23. However, the present invention is not limited to this, and, for example, the plurality of fibers may be composed of: fibers which are substantially parallel to one another and are oriented such that their longitudinal directions substantially correspond to one direction within the in-plane direction of the other layer part, and other fibers which are substantially parallel to one another and are oriented such that their longitudinal directions substantially correspond to a direction crossing the fibers in the in-plane direction of the other layer part, in particular, to a direction substantially perpendicular to those therein.

When an orientation angle of each fiber 20a in the other layer part 23 in the second portion 20 is defined as an angle of the longitudinal direction of the fiber 20a relative to one direction within the in-plane direction of the other layer part 23, an average value of the orientation angles may be within a range from about 0 degrees to about 30 degrees, in particular, within a range from about 0 degrees to about 10 degrees.

Seat Rail of Motorcycle

Figure 2:
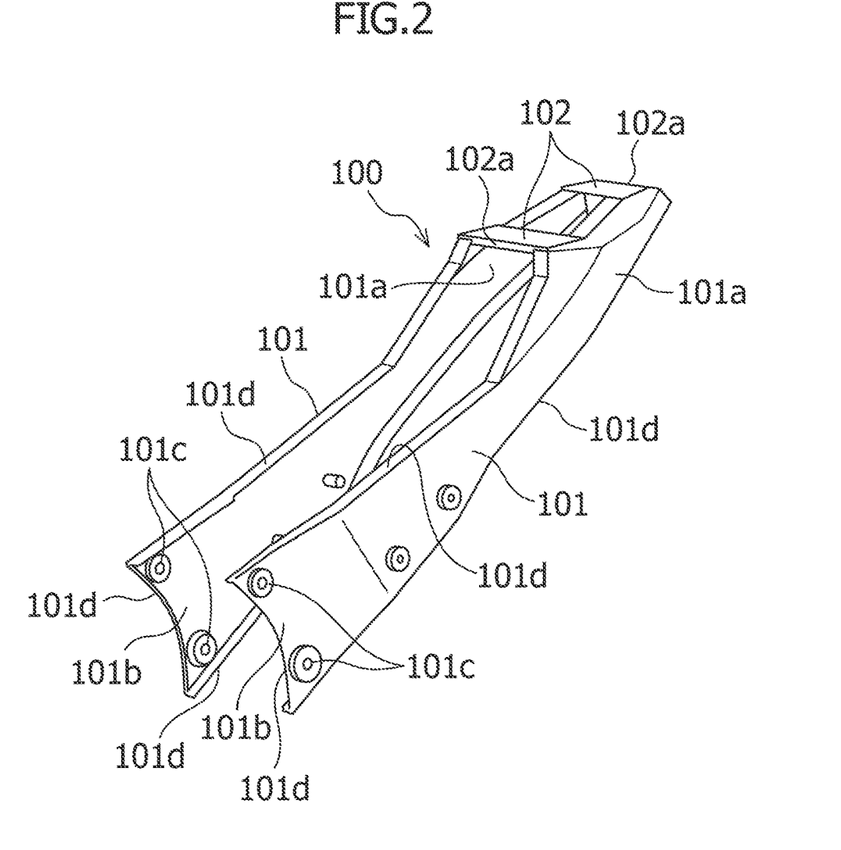
FIG. 2 is a perspective view schematically showing a seat rail, of a motorcycle, to which at least one of fiber reinforced resin structure bodies according to First and Second Embodiments.

A seat rail 100, of a motorcycle, to which the edge structure of the structure body according to the present Embodiment is applied, is described with reference to FIG. 2. The seat rail 100 is formed into a substantial U-shape in plan view of the motorcycle. The seat rail 100 has a pair of seat rail side portions 101 arranged so as to be spaced from each other in the width direction of the motorcycle (vehicle width direction), and seat rail rear end portions 102 connecting rear end parts 101a of the pair of seat rail side portions 101 in the front-rear direction of the motorcycle (vehicle front-rear direction).

Although not specially shown in the figure, the seat rail 100 is positioned on the upper side in the upper-lower direction of motorcycle (vehicle upper-lower direction) relative to the rear wheel of the motorcycle. Front end parts 101b of the seat rail side portions 101 in vehicle front-rear direction are fastened to a vehicle body member (not shown), of the motorcycle, which is positioned vehicle frontward of the seat rail 100. Fastening portions 101c for the fastening are provided on the front end parts 101b of the seat rail side portions 101.

The edge structure of the structure body according to the present Embodiment can be applied to the seat rail 100 as above. Furthermore, the edge structure of the structure body can be applied to outer circumferential edge parts 101*d*, 102*a* of the seat rail side portions 101 and the seat rail rear end portions 102.

Manufacturing Method of Fiber Reinforced Resin Structure Body

A manufacturing method of the fiber reinforced resin structure body according to the present Embodiment is described with reference to FIG. 3A and FIG. 3B. The structure body is a press-molded article, and the structure body is produced by press-molding.

Figure 3A:
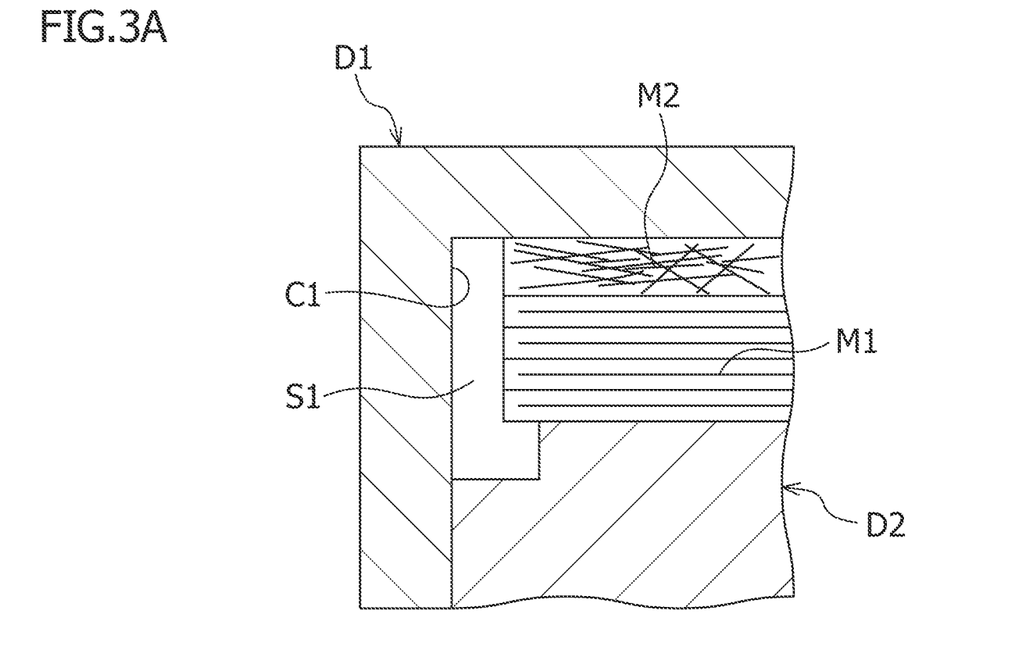
FIG. 3A and FIG. 3B are longitudinal cross-sectional views schematically showing the outer circumferential edge part of the fiber reinforced resin structure body according to the First Embodiment and its periphery, before pressing and after the pressing, respectively, for explaining a manufacturing method of the fiber reinforced resin structure body.
Figure 3B:
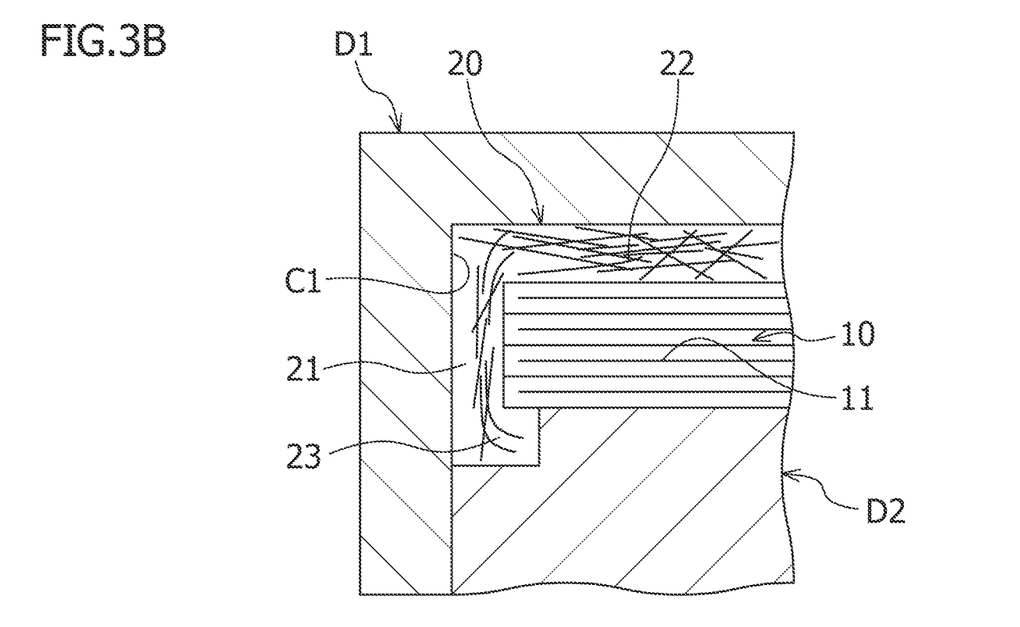

As shown in FIG. 3A and FIG. 3B, in the press-molding, an upper die D1 positioned on the first portion 10 side in the thickness direction of the structure body, and a lower die D2 positioned on the second portion 20 side therein are used. Notably, in the press-molding, the side on which the upper die D1 is positioned is defined as the upper side, and the side on which the lower die D2 is positioned is defined as the lower side. The upper die D1 and the lower die D2 are configured to collectively form a product part C1 corresponding to the external form of the structure body. Notably, the positions in height of the upper die and the lower die may be reversed.

When the fibers 20*a* of the second portion 20 are discontinuous fibers, press-molding using the upper die D1 and the lower die D2 is as follows. As shown in FIG. 3A, a first material M1 used for production of the first portion 10 and a second material M2 used for production of the second portion 20 are prepared. Each of the first and second materials M1, M2 may be formed into a substantially flat plate shape. The first and second materials M1, M2 are arranged in a state of being overlapped one on the other in the product part C1 formed by the upper die D1 and the lower die D2. In particular, the substantially flat plate-shaped first and second materials M1, M2 may be arranged in a stacked state in the product part C1. In this stage, the first and second materials M1, M2 are arranged such that a space S1 for forming the edge-side cover part 21 and the other layer part 23 of the second portion 20 remains in the product part C1. The first and second materials M1, M2 are pressed so as to be clamped in the vertical direction between the upper die D1 and the lower die D2. As shown in FIG. 3B, such pressing allows the second material M2 to flow in the space S1. As a result, the structure body mentioned above is produced.

Furthermore, although not particularly definitely shown in the figures, when the fibers of the second portion are continuous fibers, press-molding using the upper die and the lower die mentioned above is as follows. The first material used for production of the first portion and second materials used for production of the second portion are prepared. The first material is arranged in the product part formed by the upper die and the lower die, and the second materials are arranged along an edge section corresponding portion, one surface corresponding portion and another surface corresponding portion, of the first material, which respectively correspond to the edge section, the one surface and the other surface of the layer part of the first portion. The first and second materials are pressed so as to be clamped in the vertical direction between the upper die and the lower die. As a result, the structure body is produced.

Notably, when the second material is composed of a thermo-plastic resin, the second material may be preheated by an infrared heater or the like to arrange the second material thus heated along with the first material in the product part formed by the upper die and the lower die, to press these first and second materials by the upper die and the lower die, and after that, to cool the produced structure body. When the second material is composed of a thermosetting resin, the fibers may be impregnated with the thermosetting resin to arrange the second material in which the thermosetting resin is brought into a semi-cured state along with the first material in the product part formed by the upper die and the lower die, to press these first and second materials by the upper die and the lower die, and in this stage, to thermally cure the thermosetting resin. Furthermore, the first material may be a molded article obtained by separate molding from the press-molding above. However, the first material may be press-molded along with the second material.

Furthermore, the structure body can also be produced by injection molding. In this case, by causing the second material to flow into the other surface corresponding portion of the first material from the one surface corresponding portion of the same through the edge section corresponding portion of the same, the flow can arrange the fibers in the edge-side cover part of the second portion along the edge section of the layer part of the first portion.

As above, according to the edge structure of the structure body according to the present Embodiment, the edge section 11*a* of the layer part 11 of the first portion 10 is covered by the edge-side cover part 21 of the second portion 20, and the fibers 20*a* in the edge-side cover part 21 are arranged along the edge section 11*a* of the layer part 11. Furthermore, when the orientation angle of each fiber 20*a* in the edge-side cover part 21 in the second portion 20 is defined as the angle of the longitudinal direction of the fiber 20*a* relative to the shortest straight line connecting both ends, in the thickness direction of the edge section 11*a*, of the edge section 11*a* in the first portion 10, the average value of the orientation angles can be within a range from about 0 degrees to about 30 degrees or within a range from about 0 degrees to about 10 degrees. Therefore, in the edge structure of the structure body, strength, in the thickness direction of the edge section 11*a*, of the edge section 11*a* in the first portion 10 can be efficiently enhanced, and the edge section 11*a* can be efficiently protected. That is, the edge part of the structure body can be efficiently reinforced, and the edge part of the structure body can be efficiently protected. In particular, even when stress concentrates on the edge part of the structure body, breakage, such as delamination etc. can be efficiently suppressed from arising on the first portion 10. Furthermore, incidentally, the edge part of the structure body can be efficiently reinforced without additional members or the like, the edge part of the structure body can be efficiently protected, and thus, an increase in the number of components and an increase in the number of production steps can be suppressed.

According to the edge structure of the structure body according to the present Embodiment, since the one layer part 22 of the second portion 20 as well as the edge-side cover part 21 of the second portion 20 is combined with the first portion 10 in a state in contact with the first portion 10, the contact area between the first and second portions 10, 20 can be increased, and close contact between the first and second portions 10, 20 can be enhanced. In particular, since press-molding can join the layer part 11 of the first portion 10 to the edge-side cover part 21 and the one layer part 22 of the second portion 20, joining strength, in particular, bonding strength between the first and second portions 10, 20 can be enhanced. Accordingly, the edge part of the structure body can be efficiently reinforced. Furthermore, the edge part of a stacked body can be efficiently protected by the edge-side cover part 21 of the second portion 20 while the stacked body is being formed with the layer part 11 of the first portion 10 and the one layer part 22 of the second portion 20.

According to the structure body according to the present Embodiment, since the other layer part 23 of the second portion 20 as well as the edge-side cover part 21 and the one layer part 22 of the second portion 20 is combined with the first portion 10 in a state in contact with the first portion 10, the contact area between the first and second portions 10, 20 can be increased, and close contact between the first and second portions 10, 20 can be enhanced. In particular, since press-molding can join the layer part 11 of the first portion 10 to the edge-side cover part 21 and the one and the other layer parts 22, 23 of the second portion 20, joining strength, in particular, bonding strength between the first and second portions 10, 20 can be enhanced. Accordingly, the edge part of the structure body can be efficiently reinforced.

Second Embodiment

The edge structure of a fiber reinforced resin structure body according to the Second Embodiment is described along with a seat rail of a motorcycle to which it is applied. The edge structure of the structure body according to the present Embodiment is applied to a peripheral part of a fastening hole of the structure body.

Outline of Edge Structure of Fiber Reinforced Resin Structure Body

Figure 4:
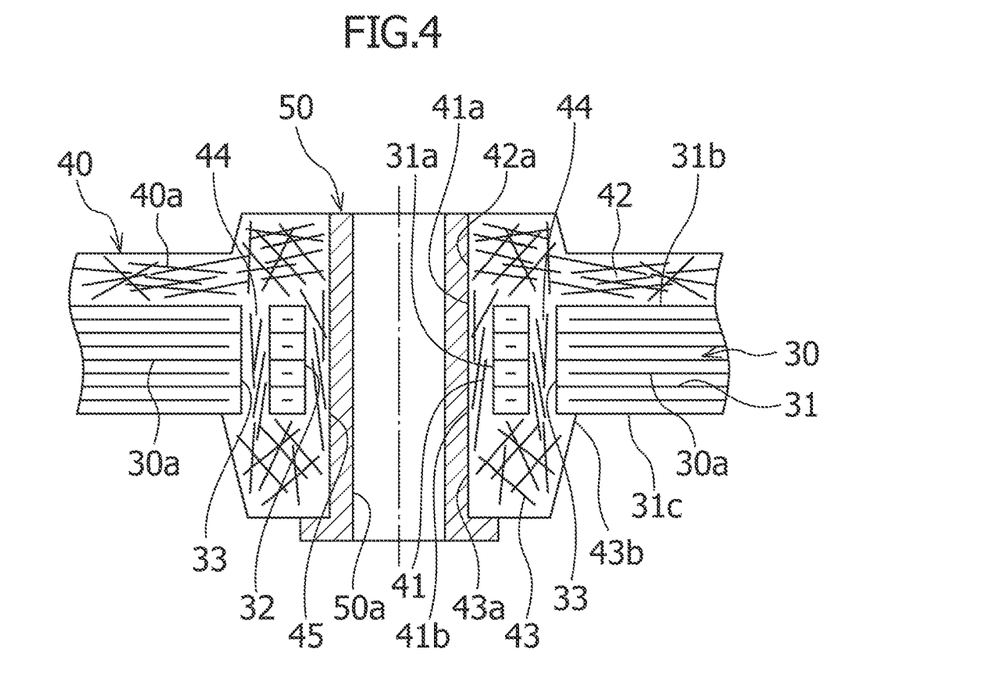
FIG. 4 is a longitudinal cross-sectional view schematically showing a fastening hole of the fiber reinforced resin structure body according to the Second Embodiment and its periphery.
Figure 5:
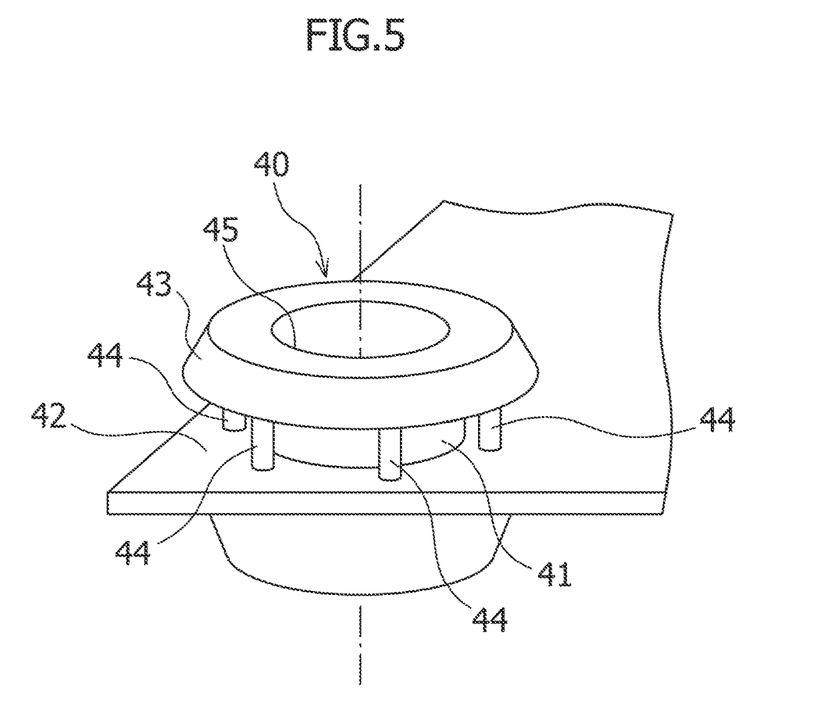
FIG. 5 is a perspective view schematically showing a fastening hole of a second fiber reinforced resin portion of the fiber reinforced resin structure body according to the Second Embodiment and its periphery, as seen from another side in the thickness direction.

An outline of the edge structure of a fiber reinforced resin structure body according to the present Embodiment is described with reference to FIG. 4 and FIG. 5. Notably, a vertical cross-sectional view of FIG. 4 shows a state taken along the center axis of a fastening hole of the structure body. The edge structure of the structure body according to the present Embodiment is the same as the edge structure of the structure body according to the First Embodiment, except the following described as a different configuration.

As shown in FIG. 4, the structure body according to the present Embodiment has first and second portions 30, 40 respectively corresponding to the first and second portions 10, 20 of the First Embodiment. The first and second portions 30, 40 respectively have fibers 30a, 40a corresponding to the fibers 10a, 20a of the First Embodiment.

The first portion 30 has a layer part 31 corresponding to the layer part 11 of the First Embodiment. The layer part 31 has an edge section 31a, one surface 31b, and the other surface 31c respectively corresponding to the edge section 11a, the one surface 11b, and the other surface 11c of the First Embodiment.

The second portion 40 has an edge-side cover part 41, one layer part 42, and the other layer part 43 respectively corresponding to the edge-side cover part 21, the one layer part 22, and the other layer part 23 of the First Embodiment. The edge-side cover part 41 has one and the other end sections 41a, 41b respectively corresponding to the one and the other end sections 21a, 21b of the First Embodiment. The one layer part 42 has an outer edge section 42a corresponding to the outer edge section 22a of the First Embodiment. The other layer part 43 has an outer edge section 43a and an inner edge section 43b respectively corresponding to the outer edge section 23a and the inner edge section 23b of the First Embodiment.

In this structure body, the layer part 31 of the first portion 30 has a fastening hole 32 which is formed so as to penetrate the layer part 31 in its thickness direction and into which a fastening member (not shown) is to be inserted. The edge section 31a of the layer part 31 is a peripheral section of the fastening hole 32.

The fibers 40a in the edge-side cover part 41 in the second portion 40 are arranged along the edge section 31a of the layer part 31 of the first portion 30. A state in which the fibers 40a are arranged in the edge-side cover part 41, may be defined by orientation angles of the fibers 40a as follows. When an orientation angle of each fiber 40a in the edge-side cover part 41 in the second portion 40 is defined as an angle of the longitudinal direction of the fiber 40a relative to a shortest straight line connecting both ends, in the thickness direction of the edge section 31, of the edge section 31a in the first portion 30, in particular, when the orientation angle is defined as an angle of the longitudinal direction of the fiber 40a relative to the center axis of the fastening hole 32, an average value of the orientation angles may be within a range from about 0 degrees to about 30 degrees, in particular, within a range from about 0 degrees to about 10 degrees.

Notably, a calculation method of the average value of orientation angles for the plurality of fibers 40a in the edge-side cover part 41 and a measurement method of the orientation angles of the fibers 40a are the same as those in the First Embodiment. Notably, in the measurement method of the orientation angles of the fibers according to the present Embodiment, in particular, the orientation angles of the fibers 40a that are positioned on one plane along the center axis of the fastening hole 32 may be measured.

Furthermore, in the periphery of the fastening hole 32, a plurality of through holes 33 may be formed so as to penetrate the layer part 31 of the first portion 30 between the one surface 31b and the other surface 31c in the thickness direction. The plurality of through holes 33 may be arranged so as to be spaced from one another in the circumferential direction of the fastening hole 32. As shown in FIG. 4 and FIG. 5, the second portion 40 may have a plurality of support column parts 44 respectively arranged in the plurality of through holes 33 of the first portion 30. The support column parts 44 may be formed integrally with the one and other layer parts 42, 43 of the second portion 40. However, the present invention is not limited to this, but the first portion may have one through hole, and the second portion may have one support column part arranged in the one through hole.

Details of Edge Structure of Fiber Reinforced Resin Structure Body

Details of the edge structure of a fiber reinforced resin structure body according to the present Embodiment are described with reference to FIG. 4. That is, the edge structure of the structure body may be configured as follows in more detail. In the structure body, the edge-side cover part 41 of the second portion 40 is arranged along the edge section 31a which is the peripheral section of the fastening hole 32 of the first portion 30. Therefore, the second portion 40 has a fastening hole 45 likewise, the edge-side cover part 41 is to configure the peripheral part of the fastening hole 45. More specifically, the edge-side cover part 41 is to configure the peripheral part of the fastening hole 45 along with the outer edge sections 42a, 43a of the one and other layer parts 42, 43.

In the support column part 44 of the second portion 40, the plurality of fibers 40a are arranged along the extending direction of the support column part 44. The longitudinal directions of the plurality of fibers 20a may be oriented at angles from about 0 degrees to about 45 degrees, preferably at angles from about 0 degrees to about 30 degrees, still preferably at angles from about 0 degrees to about 10 degrees, relative to the extending direction of the support column part 44. Furthermore, when the fiber reinforced resin of the second portion 40 is a continuous fiber reinforced resin, the plurality of fibers 40a may be substantially parallel to one another, and furthermore, the longitudinal directions of the plurality of fibers 20a may substantially correspond to the extending direction of the support column part 44.

When an orientation angle of each fiber 40a in the support column part 44 in the second portion 40 is defined as an angle of the longitudinal direction of the fiber 40a relative to the extending direction of the support column part 44, an average value of the orientation angles may be within a range from about 0 degrees to about 30 degrees, in particular, within a range from about 0 degrees to about 10 degrees.

The structure body has a collar 50 inserted into the fastening hole 45 of the second portion 40. The collar 50 is formed in a substantially cylinder shape. The collar 50 has an insertion hole 50a penetrating it in its axis direction. A fastening member (not shown) is to be inserted into the insertion hole 50a.

Seat Rail of Motorcycle

Referring to FIG. 2 again, the seat rail 100, of a motorcycle, to which the edge structure of the structure body according to the present Embodiment is applied, is described. Notably, the seat rail 100 is the same as that in the First Embodiment, and the structure body according to the present Embodiment can also be applied to the seat rail 100. Furthermore, the edge structure of the structure body according to the present Embodiment may be applied to the peripheral parts (not shown) of fastening holes formed in the fastening portions 101c in the front end parts 101b of the seat rail side portions 101.

Manufacturing Method of Fiber Reinforced Resin Structure Body

Figure 6A:
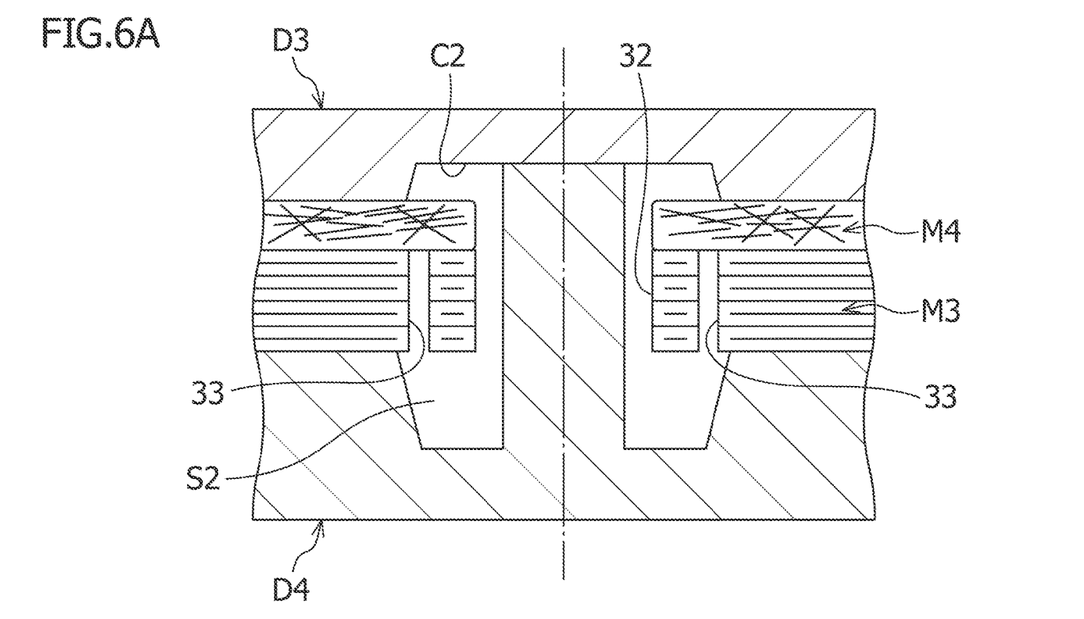
FIG. 6A and FIG. 6B are longitudinal cross-sectional views schematically showing the fastening hole of the fiber reinforced resin structure body according to the Second Embodiment and its periphery, before pressing and after the pressing, respectively, for explaining a manufacturing method of the fiber reinforced resin structure body.
Figure 6B:
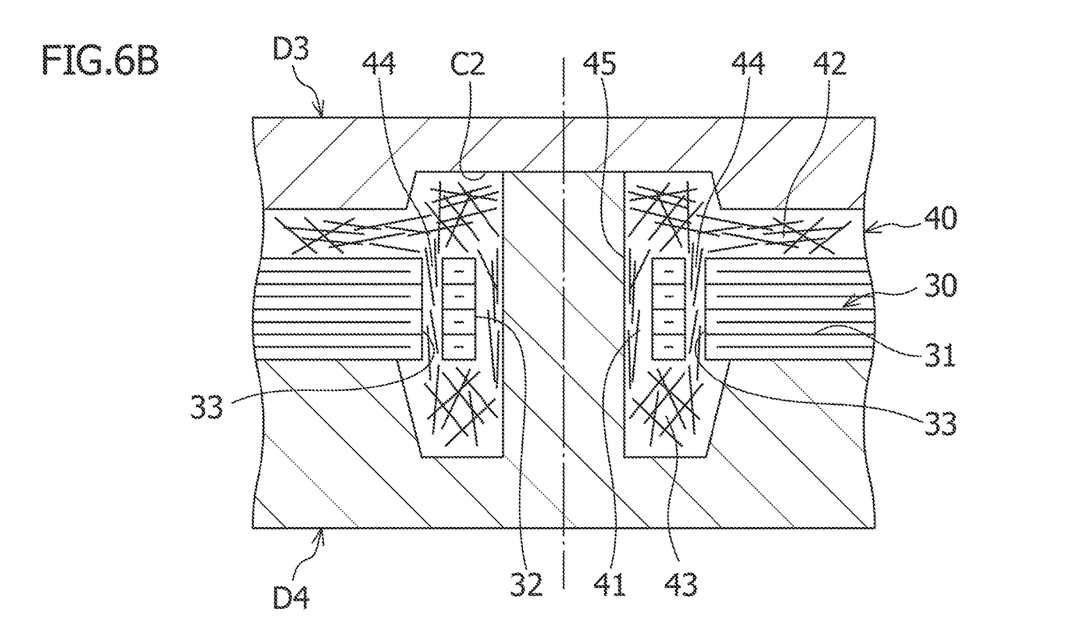

A manufacturing method of the fiber reinforced resin structure body according to the present Embodiment is described with reference to FIG. 6A and FIG. 6B. Notably, vertical cross-sectional views of FIG. 6A and FIG. 6B show states taken along the center axis of a fastening hole of the structure body. The structure body is a press-molded article which is the same as that in the First Embodiment, the structure body is produced by press-molding.

As shown in FIG. 6A and FIG. 6B, in the press-molding, an upper die D3 positioned on the first portion 30 side in the thickness direction of the structure body, and a lower die D4 positioned on the second portion 40 side therein are used. Notably, in the press-molding, the side on which the upper die D3 is positioned is defined as the upper side, and the side on which the lower die D4 is positioned is defined as the lower side. The upper die D3 and the lower die D4 are configured to collectively form a product part C2 corresponding to the external form of the structure body. Notably, the positions in height of the upper die and the lower die may be reversed.

When the fibers 40a of the second portion 40 are discontinuous fibers, press-molding using the upper die D3 and the lower die D4 is as follows. As shown in FIG. 6A, a first material M3 used for production of the first portion 30 and a second material M4 used for production of the second portion 40 are prepared. Each of the first and second materials M3, M4 may be formed into a substantially flat plate shape. The fastening hole 32 and the through holes 33 of the first portion 30 are formed in the first material M3. The first and second materials M3, M4 are arranged in a state of being overlapped on each other in the product part C2 formed by the upper die D3 and the lower die D4. In particular, the substantially flat plate-shaped first and second materials M3, M4 may be arranged in a stacked state in the product part C2. In this stage, the third and fourth materials M3, M4 are arranged such that a space S2 for forming the edge-side cover part 41 and the other layer part 43 of the second portion 40 remains in the product part C2. The first and second materials M3, M4 are pressed so as to be clamped in the upper-lower direction between the upper die D3 and the lower die D4. As shown in FIG. 6B, this pressing allows the second material M4 to flow in the space S2 and the through holes 33 of the first material M3. As a result, the structure body mentioned above is produced.

Furthermore, although not particularly definitely shown in the figures, when the fibers of the second portion are continuous fibers, press-molding using the upper die and the lower die mentioned above is as follows. The first material used for production of the first portion and second materials used for production of the second portion are prepared. The first material is arranged in the product part formed by the upper die and the lower die, and the second materials are arranged along an edge section corresponding portion, one surface corresponding portion and another surface corresponding portion, of the first material, which respectively correspond to the edge section, the one surface and the other surface of the layer part of the first portion, so as to pass through the through hole corresponding portions, of the first material, which correspond to the through holes 33 of the first portion. The first and second materials are pressed so as to clamped in the upper-lower direction between the upper die and the lower die. As a result, the structure body is produced.

Notably, the present Embodiment is the same as the First Embodiment in both cases in which the second material is produced using a thermo-plastic resin and in which the second material is produced using a thermosetting resin. Furthermore, the structure body according to the present Embodiment can also be produced by injection molding.

As above, according to the edge structure of the structure body according to the present Embodiment, the same effects of the edge structure of the structure body according to the First Embodiment can be obtained. Furthermore, according to the edge structure of the structure body according to the present Embodiment, the peripheral part of a fastening hole at which stress tends to concentrate can be particularly efficiently reinforced, and the peripheral part of the fastening hole can be efficiently protected.

According to the edge structure of the structure body according to the present Embodiment, in the periphery of a fastening hole on which stress tends to concentrate, close contact between the first and second portions 30, 40 can be enhanced by the support column parts 44 of the second portion 40. Joining strength, in particular, bonding strength between the first and second portions 30, 40 can be enhanced particularly by joining of the first and second portions 30, 40 by press-molding and the support column parts 44 of the second portion 40. Accordingly, the edge part of the structure body can be efficiently reinforced.

Embodiments of the present invention have been described as above. The present invention is not limited to the Embodiments above, and the present invention can be modified or altered based on its technical concept.

REFERENCE SIGNS LIST

10, 30 . . . First fiber reinforced resin portion (First portion)
10a, 30a . . . Fiber
11, 31 . . . Layer part
11a, 31a . . . Edge section 11b, 31b . . . One surface
11c, 31c . . . The other surface
20, 40 . . . Second fiber reinforced resin portion (Second portion)
20a, 40a . . . Fiber
21, 41 . . . Edge-side cover part
22, 42 . . . One layer part
23, 43 . . . The other layer part
32 . . . Fastening hole
33 . . . Through hole
44 . . . Support column part

The invention claimed is:

1. An edge structure of a fiber reinforced resin structure body, comprising:
　first and second fiber reinforced resin portions composed using a fiber reinforced resin, the first fiber reinforced resin portion having a layer part formed in layers, fibers of the second fiber reinforced resin portion being discontinuous fibers,
　wherein the second fiber reinforced resin portion has:
　　an edge-side cover part extending along an edge section of the layer part of the first fiber reinforced resin portion;
　　one layer part arranged along one surface, in a thickness direction of the layer part, of the layer part in the first fiber reinforced resin portion; and
　　another layer part arranged along another surface, in the thickness direction of the layer part, of the layer part in the first fiber reinforced resin portion,
　wherein a plurality of fibers in the edge-side cover part are arranged along the edge section of the layer part, the another layer part and the one layer part are formed integrally with the edge-side cover part, and the edge-side cover part has another end section positioned closer to the another layer part in the thickness direction of the layer part,
　wherein the another layer part has:
　　an outer edge section positioned so as to correspond to the another end section of the edge-side cover part in an in-plane direction of the another layer part; and
　　an inner edge section positioned so as to face the outer edge section of the another layer part in the in-plane direction of the another layer part, and
　wherein the fiber reinforced resin structure body is a press-molded body, and the edge-side cover part and the another layer part of the second fiber reinforced resin portion are composed of the fiber reinforced resin which has been flowed from the one layer part of the second fiber reinforced resin portion during a press-molding of the fiber reinforced resin structure body.

2. The edge structure of a fiber reinforced resin structure body according to claim 1, wherein, when an orientation angle of each fiber in the edge-side cover part in the second fiber reinforced resin portion is defined as an angle of a longitudinal axis of this fiber relative to a shortest straight line connecting both ends, in a thickness direction of the edge section, of the edge section in the first fiber reinforced resin portion, an average value of the orientation angles for the plurality of fibers in the edge-side cover part is within a range from 0 degrees to 30 degrees.

3. The edge structure of a fiber reinforced resin structure body according to claim 1, wherein the edge section of the layer part of the first fiber reinforced resin portion is a peripheral section of a fastening hole that is formed so as to penetrate the layer part in its thickness direction and into which a fastening member is to be inserted.

4. The edge structure of a fiber reinforced resin structure body according to claim 3, wherein, in a periphery of the fastening hole, a through hole that is formed so as to penetrate the layer part of the first fiber reinforced resin portion between one surface and another surface in the thickness direction of the layer part, is formed,
　the second fiber reinforced resin portion has a support column part arranged in the through hole of the first fiber reinforced resin portion, and
　the support column part is formed integrally with the one and other layer parts.

* * * * *